Patented Sept. 20, 1932

1,878,531

UNITED STATES PATENT OFFICE

WILHELM NEELMEIER AND THEODOR NOCKEN, OF LEVERKUSEN-ON-THE-RHINE, GERMANY, ASSIGNORS TO GENERAL ANILINE WORKS, INC., OF NEW YORK, N. Y., A CORPORATION OF DELAWARE

DYESTUFFS OF THE SAFRANINE SERIES AND THE PROCESS OF MAKING THEM

No Drawing. Application filed October 29, 1928, Serial No. 315,920, and in Germany November 7, 1927.

The present invention relates to new dyestuffs of the safranine series and to a process of preparing them, more particularly it relates to dyestuffs having in form of their salts with mineral acids the probable general formula:

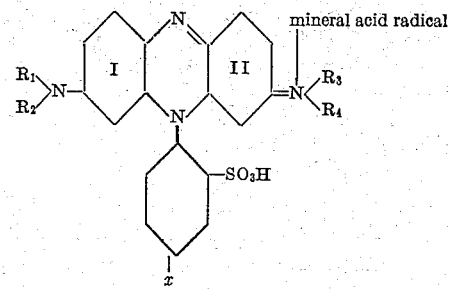

wherein $x$ represents a substituent of the group consisting of $NH_2$, $NO_2$, and NH-acidyl; $R_1$, $R_2$, $R_3$ and $R_4$ stand for substituents of the group consisting of hydrogen, alkyl and aryl, and wherein the nuclei marked as I and II may be further substituted, for instance by halogen, alkyl or sulfonic acid groups.

The new dyestuffs of the above given probable formula are obtainable by oxidizing together a compound of the general formula:

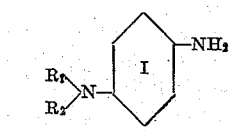

wherein $R_1$ and $R_2$ stand for a substituent of the group consisting of hydrogen, alkyl and aryl, and wherein the nucleus marked as I may be further substituted but one ortho-position to the $NH_2$ group is unoccupied with a compound of the general formula:

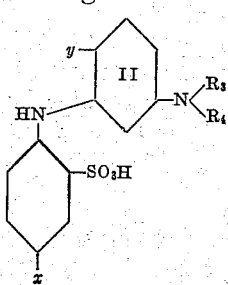

wherein $x$ stands for $NH_2$, $NO_2$ or NH-acidyl, $R_3$ and $R_4$ mean hydrogen, alkyl or aryl and wherein the nucleus II may be further substituted but the position $y$ in the nucleus II is unoccupied.

The oxidation process may be performed according to one of the methods used in the manufacture of safranine dyestuffs, for instance, while using as oxidizing agents bichromates in acetic acid or dilute mineralic acid solution, or potassium ferricyanide or in some cases even air in alkaline solution. The temperatures during the process may vary within wide limits depending on the oxidizing agent as well as on the starting materials used.

The oxidation probably takes place in two stages at first compounds of the probable formula

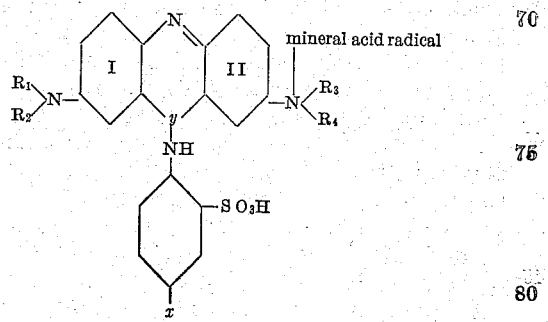

(wherein the reference characters have the above given signification) and wherein the position $y$ in the nucleus I is unoccupied, and then the safranines themselves being formed. When oxidizing in an acid medium it will often be of advantage to neutralize the acid after the first step of the reaction, for instance, by the addition of calcium-carbonate, and thereupon adding new quantities of an oxidizing agent for performing the second step.

The shades of our new dyestuffs can be improved in many cases by boiling the dyestuffs with diluted sulfuric acid or with an aqueous solution of an alkali metal carbonate, or by treating them with a reducing agent, such as zinc in diluted acetic acid, sodium hydrosulfite in alkaline solution, and the like and re-oxidizing the leucocompounds thus formed, for instance, with a current of air.

The dyestuffs thus obtainable are in form of their salts with mineral acids dark powders with a bronze lustre, soluble in water with violet to greenish-blue colorations, soluble in sulfuric acid with a green tint and dyeing wool from an acid bath intense reddish violet to greenish blue shades. These dyeings combine a satisfactory capacity for even dyeing with good fastness to light, fulling and steaming. The dyestuffs having in form of their salts with mineral acids the probable formula:

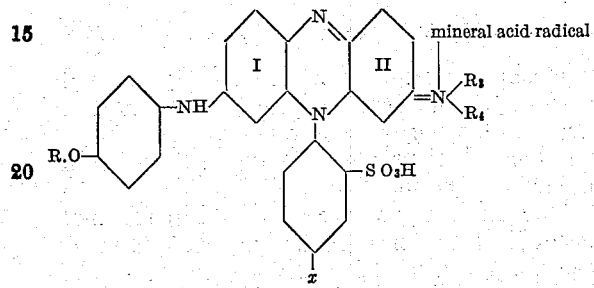

wherein R represents a residue of the group consisting of the methyl and ethyl group and the other reference characters have the above given signification, exert an especially good fastness to light.

The following examples illustrate our invention, without limiting it thereto:

*Example 1.*—335 parts by weight of 4-acetamino-3'-amino-4'-methyl-diphenylamine-2-sulfonic acid and with 294 parts by weight of 4-amino-4'-methoxy-diphenylamine-2-sulfonic acid are dissolved in 10000 parts of water while adding the requisite quantity of caustic soda to form a neutral solution. The solution is heated to 50° C. and treated for about one hour with about 2000 parts by weight of an 20% aqueous sodium bichromate solution with which 700 parts by weight of glacial acetic acid have been mixed. Thereupon 700 parts by weight of calcium carbonate are added and a further quantity of about 2000 parts by weight of an aqueous sodium bichromate solution of 20% strength is caused to run in. After stirring for about five hours at about 50° C. the resulting product is filtered and boiled with water. The filtrate is freed from chromium hydroxide, 20 ccs. of sulfuric acid of 20% strength are added per litre of liquid and the mixture is boiled for about one hour. The dyestuff cyrstallizes out on cooling. It is purified by crystallization from a weak alkaline sodium carbonate solution with the addition of sodium chloride. The dyestuff thus obtained is in form of its salts with mineral acids a dark crystalline powder with a bronze lustre. It dissolves in water with a violet coloration, in concentrated sulfuric acid with a green coloration and dyes wool from an acid bath an even violet shade fast to fulling and very fast to light. The product probably corresponds in form of its salts with mineral acids to the formula:

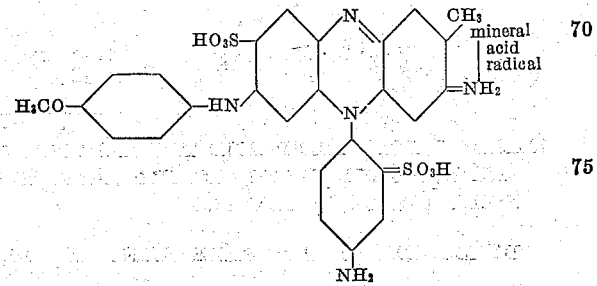

The 4-acetamino-3'-amino-4'-methyldiphenylamine-2-sulfonic acid used as starting material is obtainable by condensing 4-nitro-chlorobenzene-2-sulfonic acid with 4-methyl-1.3-phenylenediamine, reducing the nitro group and acetylating the amino group. It is a colorless crystalline powder, which turns bluish while keeping it in the air and which is readily soluble in dilute alkalies.

*Example 2.*—When replacing the 4-amino-4'-methoxy-diphenylamine-2-sulfonic acid used in Example 1 by 244 parts by weight of 4-amino-diethylaniline-3-sulfonic acid a dyestuff is obtained, which dyes wool from an acid bath a clear reddish violet. The oxidation in this case is advantageously carried out at a temperature of between 0° to about 5° C.

*Example 3.*—264 parts by weight of 4-amino-diphenylamine-2-sulfonic acid are oxidized as described in Example 2, together with 337 parts by weight of 4-nitro-3'-dimethylamino-diphenylamine-2-sulfonic acid. The dyestuff obtained is a dark crystalline powder with a bronze lustre. It dissolves in water with a reddish blue coloration, in concentrated sulfuric acid with a green coloration and dyes wool from an acid bath a fast reddish blue.

The nitro group of the dyestuff can be replaced by the amino group by treating the dyestuff with a reducing agent, for example with zinc dust in acetic acid solution or with hydrosulfite in alkaline solution and oxidizing the thus formed leuco compound.

When using instead of 4-amino-diphenylamine-2-sulfonic acid, 4-amino-4'-methoxy-diphenylamine-2-sulfonic acid a similar dyestuff is obtained, dyeing wool blue shades very fast to light.

The 4-nitro-3'-dimethylamino-diphenylamine-2-sulfonic acid can be obtained by condensing sodium 4-nitrochlorobenzene sulfonate with 3-amino-dimethylaniline. It is a brownish powder, readily soluble in dilute alkalies.

We claim:

1. The process which comprises oxidizing together a compound of the general formula:

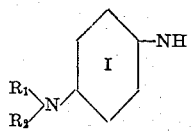

wherein $R_1$ and $R_2$ stand for a substituent of the group consisting of hydrogen, alkyl and aryl, wherein one of the ortho-positions to the $NH_2$ group is unoccupied, and wherein the nucleus marked as I may be substituted by a substituent of the group consisting of halogen, alkyl or the sulfonic acid group with a compound of the general formula:

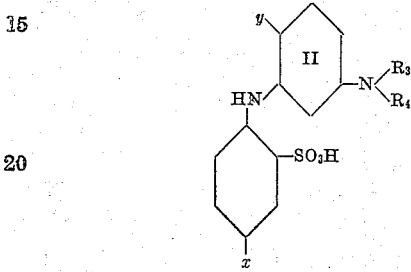

wherein the position $y$ is unoccupied, wherein $x$ stands for a substituent of the group consisting of $NH_2$, $NO_2$ and NH-acidyl, and wherein the benzene nucleus marked as II may be substituted by a substituent of the group consisting of halogen, alkyl and the sulfonic acid group.

2. The process which comprises treating a neutral aqueous solution of 335 parts by weight of 4-acetamino-3'-amino-4'-methyl-diphenylamine-2-sulfonic acid and 294 parts by weight of 4-amino-4'-methoxy-diphenylamine-2-sulfonic acid for about one hour with about 2000 parts by weight of an aqueous sodium-bichromate solution of 20% strength to which glacial acetic acid has been added, while maintaining the mixture at a temperature of about 50° C., neutralizing the acid present, adding a further quantity of about 2000 parts of an aqueous sodium-bichromate solution of 20% strength, heating the mixture for about five hours at a temperature of about 50° C., filtering the product obtained and boiling it with diluted sulfuric acid.

3. The new products having in form of their salts with mineral acids the probable formula:

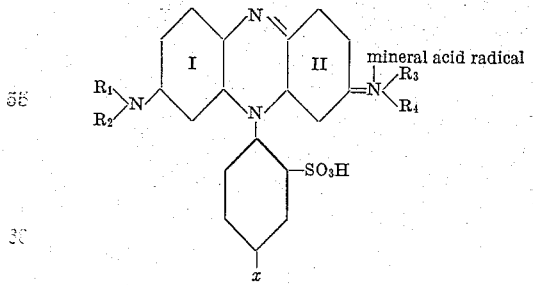

wherein $x$ represents a substituent of the group consisting of $NH_2$, $NO_2$ and NH-acidyl; $R_1$, $R_2$, $R_3$ and $R_4$ stand for substituents of the group consisting of hydrogen, alkyl and aryl, and wherein the nuclei marked as I and II may be substituted by substituents of the group consisting of halogen, alkyl and the sulfonic acid group, said products being in form of their salts with mineral acids dark powders with a bronze lustre, soluble in water with violet to greenish-blue colorations, dyeing wool from an acid bath intense reddish violet to greenish-blue shades.

4. The new products having in form of their salts with mineral acids the probable formula:

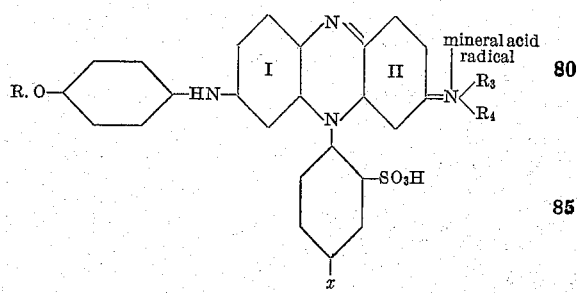

wherein $x$ represents a substituent of the group consisting of $NH_2$, $NO_2$ and NH-acidyl, R, $R_3$ and $R_4$ stand for substituents of the group consisting of hydrogen, alkyl and aryl, and wherein the nuclei marked as I and II may be substituted by substituents of the group consisting of halogen, alkyl and the sulfonic acid group, said products being in form of their salts with mineral acids dark powders with a bronze lustre, soluble in water with violet to greenish-blue colorations, dyeing wool from an acid bath intense reddish violet to greenish-blue shades of an especially good fastness to light.

5. The product having in form of its salts with mineral acids the probable formula:

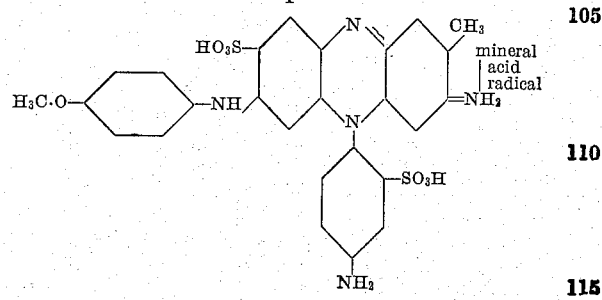

said product being in form of its salts with mineral acids a dark powder with a bronze lustre, dyeing wool from an acid bath a violet shade, fast to fulling and light.

In testimony whereof we have hereunto set our hands.

WILHELM NEELMEIER.
THEODOR NOCKEN.